(12) United States Patent
Yoo et al.

(10) Patent No.: US 10,532,738 B2
(45) Date of Patent: Jan. 14, 2020

(54) VEHICLE AND CONTROL METHOD THEREOF

(71) Applicants: Hyundai Motor Company, Seoul (KR); Kia Motors Corporation, Seoul (KR)

(72) Inventors: Kyungho Yoo, Seoul (KR); Tae Kyeong Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 214 days.

(21) Appl. No.: 15/626,845

(22) Filed: Jun. 19, 2017

(65) Prior Publication Data
US 2018/0188732 A1 Jul. 5, 2018

(30) Foreign Application Priority Data
Jan. 4, 2017 (KR) .......................... 10-2017-0001170

(51) Int. Cl.
*B60Q 1/00* (2006.01)
*B60W 30/08* (2012.01)

(52) U.S. Cl.
CPC ................... *B60W 30/08* (2013.01)

(58) Field of Classification Search
USPC ......................................................... 348/148
See application file for complete search history.

(56) References Cited

U.S. PATENT DOCUMENTS

| 9,761,144 B2* | 9/2017 | Huizen ................. G08G 1/167 |
| 2002/0011926 A1* | 1/2002 | King ....................... G01S 7/026 340/436 |
| 2006/0125919 A1* | 6/2006 | Camilleri ................ B60R 1/00 348/148 |
| 2009/0115631 A1* | 5/2009 | Foote .................. B60Q 1/2665 340/901 |
| 2012/0026012 A1* | 2/2012 | Yamashita .............. B60R 1/00 340/904 |
| 2014/0098230 A1* | 4/2014 | Baur .................. B60R 16/0232 348/148 |
| 2015/0192677 A1* | 7/2015 | Yu ........................ G01S 17/936 356/5.01 |
| 2016/0282468 A1* | 9/2016 | Gruver ................ H05K 999/99 |
| 2016/0368417 A1* | 12/2016 | Bassi ...................... H04N 9/09 |

FOREIGN PATENT DOCUMENTS

| EP | 2374662 A2 | 10/2011 |
| JP | H05 34121 A | 2/1993 |

* cited by examiner

*Primary Examiner* — Masud Ahmed
(74) *Attorney, Agent, or Firm* — Mintz Levin Cohn Ferris Glovsky and Popeo, P.C.; Peter F. Corless

(57) ABSTRACT

A vehicle that includes a side-view mirror, at least one sensor disposed in the side-view mirror, and configured to transmit a signal to an object, and to receive a signal reflected from the object is provided. The vehicle further includes a controller that generates driving information based on the signal received by the sensor. The controller corrects distortion of the signal generated by the side-view mirror to generate the driving information. Accordingly, space recognition and obstacle detection for the surrounding environment of the vehicle is capable of being performed using the three dimension sensor.

18 Claims, 15 Drawing Sheets

< COLD MIRROR TO REFLECT ONLY VISIBLE LIGHT >

< WAVELENGTHS OF LIGHT TRANSMITTED THROUGH COLD MIRROR >

< RANGE OF WAVELENGTHS TRANSMITTED THROUGH BAND PASS FILTER >

$$d = h - \sin\theta_1 \left[ 1 - \frac{\cos\theta_1}{\sqrt{(\frac{n2}{n1})^2 - \sin^2\theta_1}} \right]$$

FIG. 13

$$\begin{bmatrix} x_c \\ y_c \\ z_c \end{bmatrix} = R_c^{\ 1} \begin{bmatrix} x_l \\ y_l \\ z_l \end{bmatrix} + \begin{bmatrix} dx_l \\ dy_l \\ dz \end{bmatrix}$$

< PROCESS FOR COORDINATE TRANSFORMATION
INTO VEHICLE COORDINATE SYSTEM AND DATA MERGING >

VEHICLE AND CONTROL METHOD THEREOF

CROSS-REFERENCE TO RELATED APPLICATION

This application claims the benefit of Korean Patent Application No. 10-2017-0001170, filed on Jan. 4, 2017 in the Korean Intellectual Property Office, the disclosure of which is incorporated herein by reference.

BACKGROUND

1. Field of the Disclosure

The present disclosure relates to a vehicle and a control method thereof, and more particularly, to a technique of acquiring information about the surroundings of a vehicle using a sensor installed within a side-view mirror, and correcting the distortion of signals, caused by the side-view mirror, to provide a user with more accurate driving information.

2. Description of the Related Art

With the ongoing development of vehicle technologies, various types of electronic devices for vehicle, such as a hands-free apparatus, a global positioning system (GPS) receiver, a Bluetooth apparatus, a high pass apparatus, etc., are also being developed. In many vehicles, a communication apparatus that communicates with a user terminal, charging equipment for charging the user terminal, etc. are also provided within the vehicle.

Recently, various apparatuses for driving assistance and ride comfort improvement have been installed in many vehicles. In particular, an autonomous driving control apparatus for enabling a vehicle to recognize a road environment, to determine a driving situation, and to control driving of the vehicle based on a planned driving path to autonomously travel toward a destination has been developed, and research regarding the autonomous driving control apparatus is actively being conducted.

The autonomous driving control apparatus recognizes the current location and speed of the vehicle, an environment and obstacles around the vehicle, etc., generates a driving path in real time based on acquired information, and autonomously drives the vehicle. Accordingly, a vehicle having the autonomous driving control apparatus essentially requires technology of recognizing accurate topography and peripheral objects, that is, technology of acquiring accurate information regarding three-dimensional space.

To acquire accurate information regarding the three-dimensional space, a light detection and ranging (LiDAR) is often used. The LiDAR is configured to sense objects around a vehicle by transmitting signals toward objects existing in the range of 360° around the vehicle, and receiving the signals reflected from the objects. The LiDAR has an advantage that it is capable of precisely scanning a space. Generally, the LiDAR is mounted on the roof of the vehicle to prevent light emitted from the LiDAR from being blocked by or interfered with the vehicle body.

However, when the LiDAR is mounted on the roof, it is exposed to the outside and directly influenced by an external environment, such as snow, rain, dusts, etc. Also, to mount the LiDAR on the roof, an additional fixture is required to be installed on the roof of the vehicle, and the fixture may deteriorate the external appearance of the vehicle. Additionally, since the fixture exists on the roof of the vehicle, the vehicle encounters more air resistance upon traveling, which leads to a deterioration of fuel efficiency.

SUMMARY

Therefore, an aspect of the present disclosure provides a vehicle capable of providing a user with effective driving information by more accurately recognizing a surrounding environment and peripheral objects, without deteriorating the external appearance of the vehicle. Additional aspects of the disclosure will be set forth in part in the description which follows and, in part, will be obvious from the description, or may be learned by practice of the disclosure.

According to one aspect, a vehicle may include a vehicle a side-view mirror; at least one sensor disposed in the side-view mirror and configured to transmit a signal to an object and receive a signal reflected from the object; and a controller configured to generate driving information based on the signal received by the sensor, wherein the controller is configured to correct distortion of the signal, generated by the side-view mirror, to generate the driving information.

The controller may further be configured to correct the distortion of the signal, generated by at least one of a cover of the side-view mirror and a mirror of the side-view mirror and correct refraction of the signal, generated when the signal is transmitted through the cover or the mirror of the side-view mirror. The controller may also be configured to correct the distortion of the signal, based on a thickness of the mirror of the side-view mirror and an incident angle of the signal transmitted from the sensor and correct the distortion of the signal, based on a thickness of the cover of the side-view mirror and an incident angle of the signal transmitted from the sensor.

The cover and the mirror may further include a material disposed thereon that enables the signal to be transmitted through the cover and the mirror. The mirror transmits light of infrared wavelengths, and reflects light of visible wavelengths. The vehicle may further include a filter configured to transmit light of infrared wavelengths and the filter may be coated on the outer surface of the cover. The controller may be configured to generate the driving information, based on information received by the sensor disposed in the side-view mirror and the other sensor disposed in the front portion and the rear portion of the vehicle.

According to another aspect, a method of controlling a vehicle including at least one sensor disposed in a side-view mirror may include transmitting a signal to an object, and receiving a signal reflected from the object and generating driving information based on the signal received by the sensor, wherein the generating of the driving information may include correcting distortion of the signal, generated by the side-view mirror, to generate the driving information.

Further, the correcting of the distortion of the signal may include correcting the distortion of the signal, generated by at least one of a cover of the side-view mirror and a mirror of the side-view mirror. The correcting of the distortion of the signal may also include correcting refraction of the signal, generated when the signal is transmitted through the cover or the mirror of the side-view mirror. The mirror may transmit light of infrared wavelengths, and reflects light of visible wavelengths. The filter configured to transmit light of infrared wavelengths may be coated on the outer surface of the cover.

The generating of the driving information may include receiving raw data from the sensor disposed in the side-view mirror, and merging the raw data to thereby generate the driving information. Additionally, the generating of the driving information may include performing coordinate transformation on the raw data with respect to the reference point of the vehicle, and then merging the resultant data to thereby generate the driving information. The coordinate transformation may include performing rotational transformation on the raw data. Additionally, the coordinate transformation may include performing translational transformation on the raw data. The generating of the driving information may include generating driving information with respect to the sensor, and then merging the created driving information with respect to the reference point of the vehicle.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 13 illustrates an equation for performing rotational transformation based on raw data acquired by the sensor according to an exemplary embodiment of the present disclosure;

DETAILED DESCRIPTION

Figure 1:
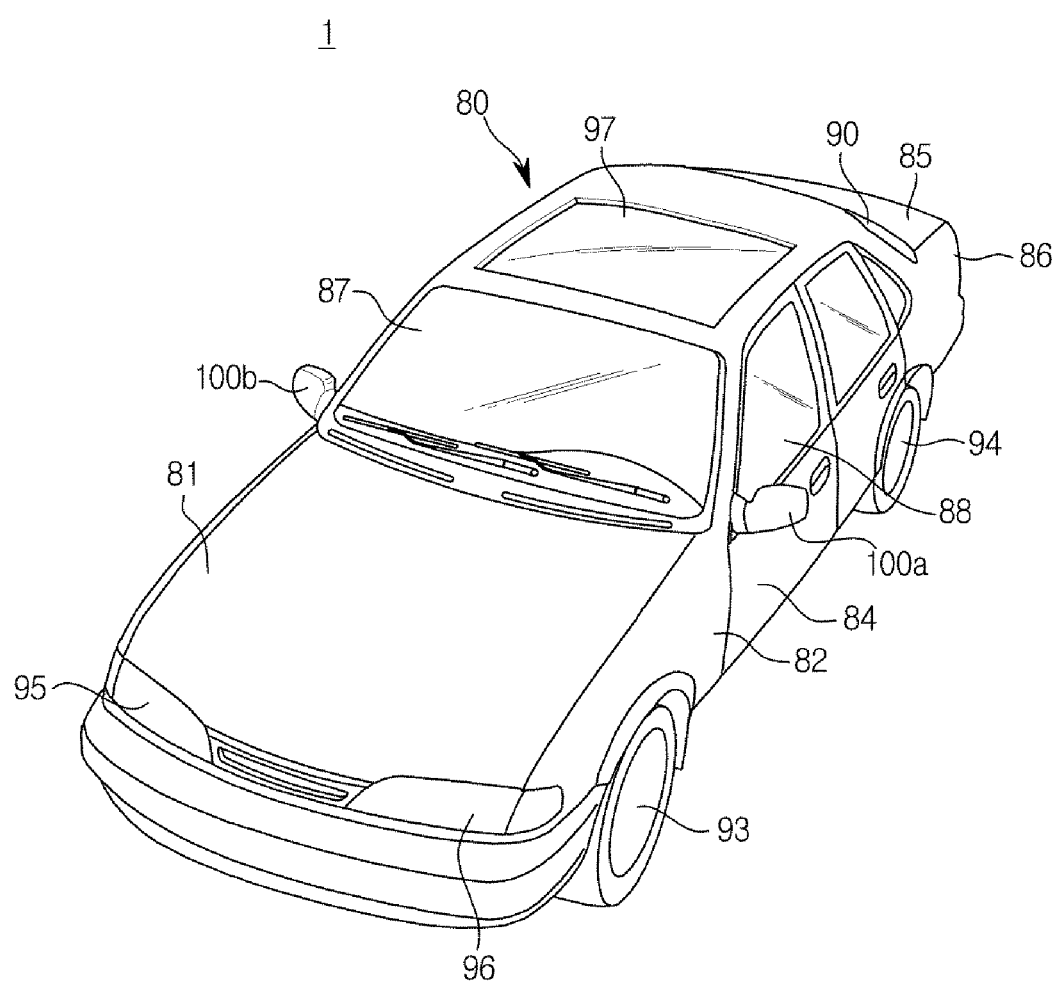
FIG. 1 illustrates the outer appearance of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Configurations illustrated in the exemplary embodiments and the drawings described in the present specification are only the exemplary embodiments of the present disclosure, and thus it is to be understood that various modified examples, which may replace the exemplary embodiments and the drawings described in the present specification, are possible when filing the present application.

The terms used in the present specification are used to describe the exemplary embodiments of the present disclosure. Accordingly, it should be apparent to those skilled in the art that the following description of exemplary embodiments of the present disclosure is provided for illustration purpose only and not for the purpose of limiting the disclosure as defined by the appended claims and their equivalents. It will be understood that, although the terms first, second, etc. may be used herein to describe various components, these components should not be limited by these terms.

Hereinafter, exemplary embodiments of the present disclosure will be described in detail with reference to the accompanying drawings so that the present disclosure may be readily implemented by those skilled in the art. In the drawings, parts irrelevant to the description are omitted for the simplicity of explanation.

Figure 2:
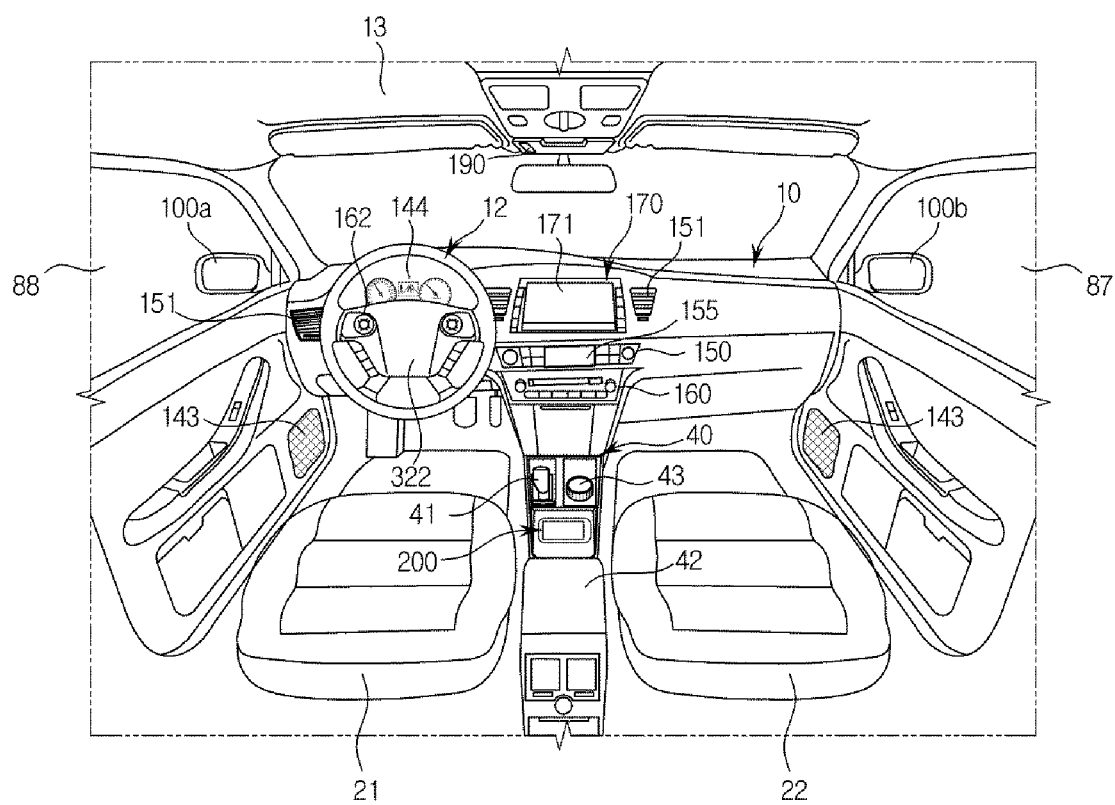
FIG. 2 illustrates the interior of a vehicle according to an exemplary embodiment of the present disclosure.

FIG. 1 illustrates the outer appearance of a vehicle according to an exemplary embodiment of the present disclosure, and FIG. 2 illustrates the interior of a vehicle according to an exemplary embodiment of the present disclosure. The following description will be given by referring to FIGS. 1 and 2 together to avoid redundant description about the same content.

Referring to FIG. 1, a vehicle 1 may include a body 80 that forms the outer appearance of the vehicle 1, and a plurality of wheels 93 and 94 to move the vehicle 1. The body 80 may include a hood 81, front fenders 82, doors 84, a trunk rid 85, and quarter panels 86. Additionally, the body 80 may include a sunshine roof 97, as shown in FIG. 1. The sunshine roof 97 is also called sunroof, and in the following description, the sunshine roof 97 will be referred to as a sunroof, for convenience of description. The body 80 may include a front window 87 installed in the front portion of the body 80 to provide a front view of the vehicle 1, a plurality of side windows 88 to provide side views of the vehicle 1, a plurality of side-view mirrors 100a and 100b installed in the doors 84 to provide rear and side views of the vehicle 1, and a rear window 90 installed in the rear portion of the body 80 to provide a rear view of the vehicle 1.

Each of the side-view mirrors 100a and 100b (100 of FIG. 3) may include a mirror 120 (see FIG. 3) to provide a user with rear and side views of the vehicle 1, and a cover 130 (see FIG. 3) that forms the outer appearance of the side-view mirror 100. Although not shown in FIGS. 1 and 2, a sensor 110 (see FIG. 3) configured to sense the surroundings of the vehicle 1 may be installed in the side-view mirror 100. The sensor 110 will be described in detail with reference to FIGS. 3 and 4, later.

Additionally, the body 80 may include a plurality of head lamps 95 and 96 installed in the head portion of the vehicle 1 to irradiate headlight to provide visibility ahead of the vehicle 1. The body 80 may further include a plurality of tail lamps (not shown) installed in the tail portion of the vehicle 1 to irradiate taillight to provide visibility behind the vehicle 1 or to help another vehicle behind the vehicle 1 detect the location of the traveling or subject vehicle 1. The operations of the sunroof 97, the head lamps 95 and 96, and the tail lamps of the vehicle 1 may be operated based on a user control command. Hereinafter, the interior of the vehicle 1 will be described.

In particular, an air conditioner 150 may be provided within the vehicle 1. The air conditioner 150, which will be described below, may be configured to automatically adjust an air-conditioning environment including the interior/exterior environment condition of the vehicle 1, the intake/exhaust of air, air circulation, a cooling/heating status, etc., or to adjust the air-conditioning environment according to a user control command. For example, the air conditioner 150 may be configured to perform both heating and cooling, and discharge heated or cooled air through a vent 151 to adjust the inside temperature of the vehicle 1.

Further, a navigation terminal 170 may be provided within the vehicle. The navigation terminal 170 may be configured to provide a navigation function to guide a vehicle toward a destination. The navigation terminal 170 may also provide an audio function and a video function. Additionally, the navigation terminal 170 may be configured to generate control signals based on user control commands received via various input devices to operate various devices installed within the vehicle 1. For example, the navigation terminal 170 may be configured to selectively display at least one of an audio screen, a video screen, and a navigation screen through a display 171. The navigation terminal 170 may also be configured to display various control screens related to the control of the vehicle 1.

The display 171 may be positioned in a center fascia 11 that corresponds to the center area of a dashboard 10. According to an exemplary embodiment, the display 170 may be a liquid crystal display (LCD), a light emitting diode (LED) display, a plasma display panel (PDP) display, an organic light emitting diode (OLED) display, or a cathode ray tube (CRT) display, although not limited to these. When the display 171 is a touch screen type, the display 171 may be configured to receive various control commands from a user through various touch operations, such as touching, clicking, dragging, etc.

Meanwhile, a center console 40 may include a center input portion 43 of a jog shuttle type or a hard key type. The center console 40 may be positioned between the driver seat 21 and a passenger seat 22, and include a gear transmission lever 41 and a tray 42. Additionally, a cluster 144 may be provided within the vehicle 1. The cluster 144 may also be referred to as an instrument panel. In the following description, for convenience of description, the cluster 144 will be referred to as a "cluster". The cluster 144 may be configured to display driving speed of the vehicle 1, revolutions per minute (RPM) of the engine, an amount of oil, etc.

A voice input portion 190 may also be provided within the vehicle 1. For example, the voice input portion 190 may be a microphone. To effectively receive a voice, the voice input portion 190 may be, as shown in FIG. 2, mounted on a headlining 13, although not limited to this. The voice input portion 190 may be mounted on the dashboard 10 or a steering wheel 12. A speaker 143 may also be provided within the vehicle 1 to output sound. Accordingly, the vehicle 1 may be configured to output sound required for performing the audio function, the video function, the navigation function, and other additional functions through the speaker 143. Meanwhile, in addition to the navigation terminal 170 and the center input portion 43 as described above, various input devices for receiving control commands for the above-described devices may be provided within the vehicle 1.

Figure 3:
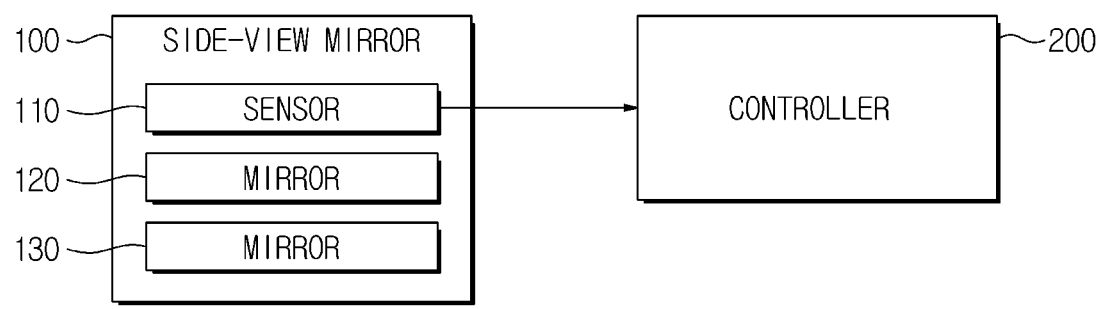
FIG. 3 is a block diagram showing a part of the internal configuration of a vehicle according to an exemplary embodiment of the present disclosure.
Figure 4:
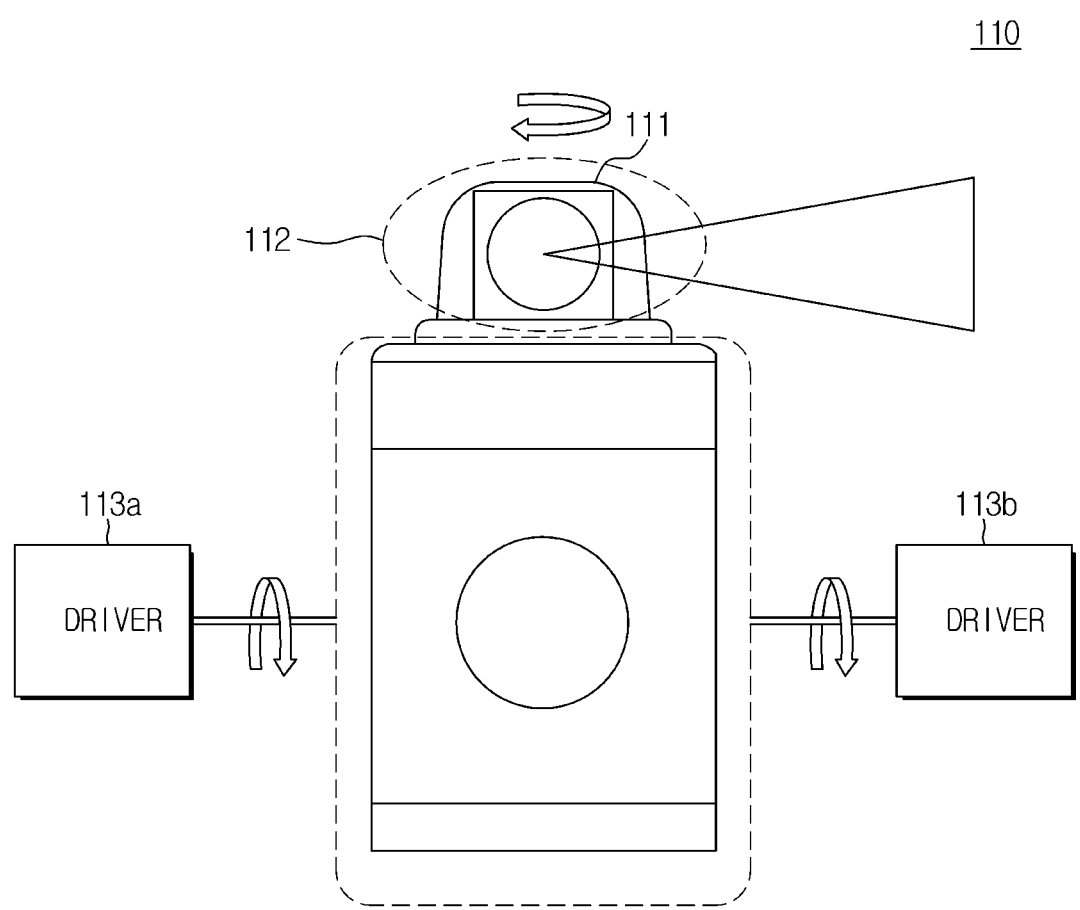
FIG. 4 illustrates the external structure of a sensor installed in the vehicle according to an exemplary embodiment of the present disclosure.
Figure 5:
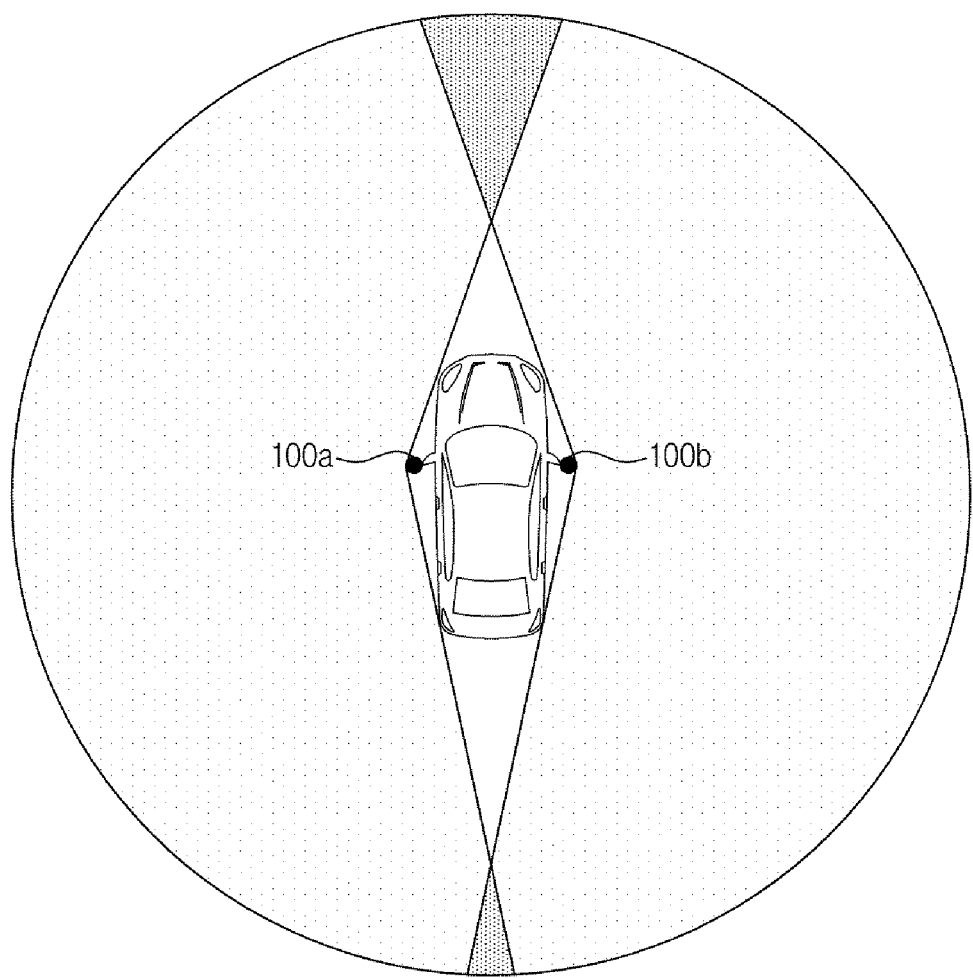
FIG. 5 illustrates a range capable of being sensed by the sensor installed in a side-view mirror, according to an exemplary embodiment of the present disclosure.
Figure 6A:
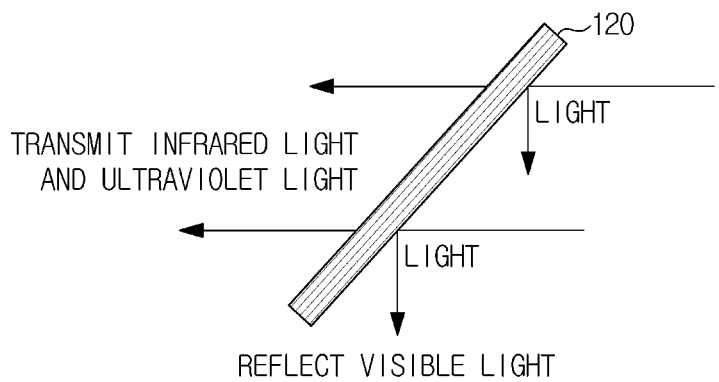
FIGS. 6A-6B illustrate the characteristics of a cold mirror mounted on the mirror of the side-view mirror, according to an exemplary embodiment of the present disclosure.
Figure 6B:
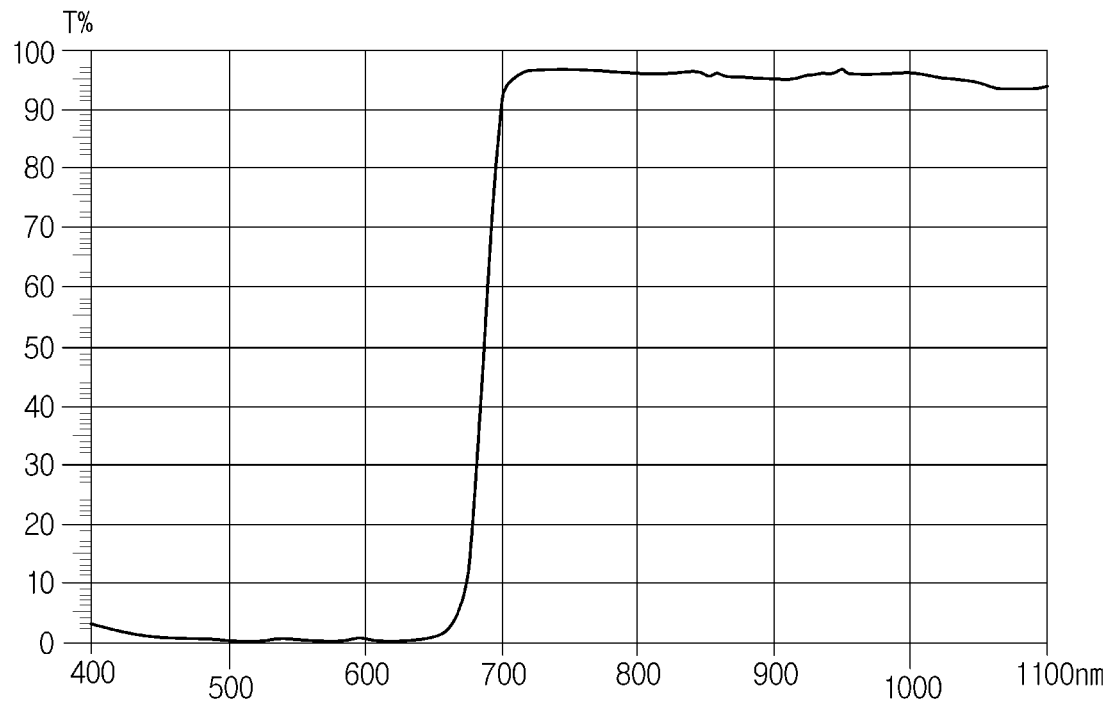
Figure 7:
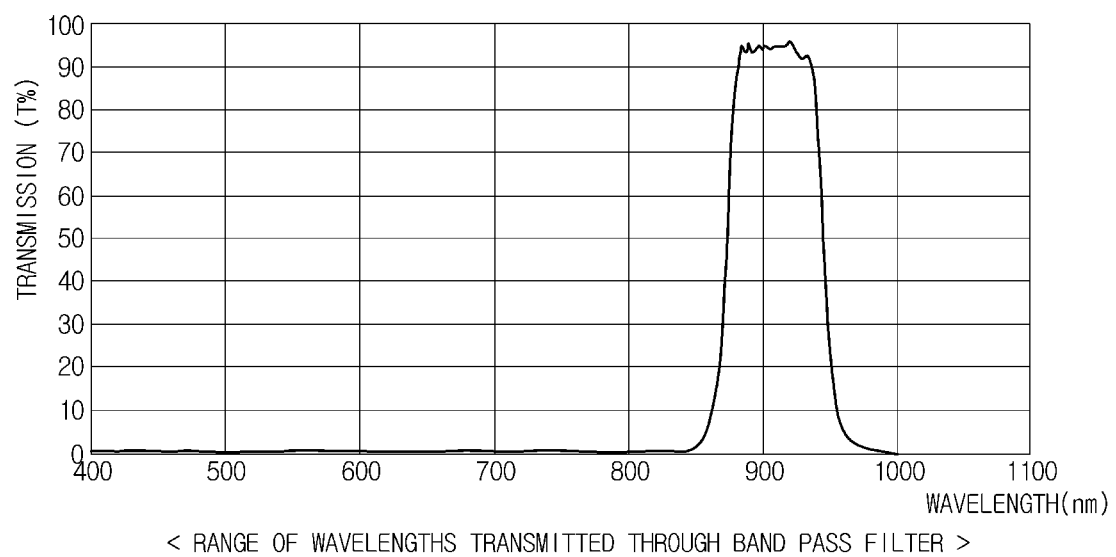
FIG. 7 illustrates a wavelength range that passes a band-pass filter according to an exemplary embodiment of the present disclosure.

FIG. 3 is a block diagram showing a part of the internal configuration of a vehicle according to an exemplary embodiment of the present disclosure, FIG. 4 illustrates the external structure of a sensor installed in the vehicle, as an example of the present disclosure, FIG. 5 illustrates a range capable of being sensed by the sensor installed in a side-view mirror, according to an exemplary embodiment of the present disclosure, FIG. 6 illustrates the characteristics of a cold mirror mounted on the mirror of the side-view mirror, according to an exemplary embodiment of the present disclosure, and FIG. 7 illustrates a wavelength range that passes a band-pass filter.

Referring to FIG. 3, the vehicle 1 may include the side-view mirror 100 and a controller 200. The side-view mirror 100 may include at least one sensor 110 configured to sense the surroundings of the vehicle 1 (e.g., the surrounding environment), a mirror 120 that provides a user with rear and side views of the vehicle 1, and a cover 130 that forms the outer appearance of the side-view mirror 100. The sensor 110 may be configured to sense the current location and moving speed of the vehicle 1, and simultaneously, may be configured to sense the surroundings of the vehicle 1 to transmit the sensed information to the controller 200.

Generally, the sensor 110 may include various types of sensors, and in an apparatus for providing autonomous driving information, a three dimension laser range finder sensor may be used. The three dimension laser range finder sensor may be a sensor configured to detect, when light emitted from a light source is reflected from an object and then returns to the sensor, a signal of the reflected light, and then to determine a distance to the object using a series of numerical computation. A method of sensing the surrounding environment in this way is referred to as a time of flight (TOF, computation using time of reception and reflection of infrared light). Generally, the three dimension laser range finder sensor may be configured to measure a distance three-dimensionally through the rotation, vertical vibration, and pitch angle vibration of a reflector installed on the reflection and incident path of light.

Referring to FIG. 4, the three dimension laser range finder sensor 110 may include a laser range finder (LRF) structure 112 configured with a light source, a sensor, etc., a reflector 111 configured to reflect emitted light and incident light, a rotating member (not shown) including a member for rotating the reflector 111, and an vertical moving member (not shown) to adjust the inclination of the reflector 111. Additionally, the three dimension laser range finder sensor 110 may include a plurality of drivers 113a and 113b configured to adjust the inclination of the rotating member of the reflector 111 and the inclination of the reflector 111. The three dimension laser range finder sensor 110 may rotate, as shown in FIG. 4, with respect to a shaft to ensure a two-dimensional field of view of 360 degrees, and when the three dimension laser range finder sensor 110 includes a plurality of light emitters and a plurality of light receivers, the three dimension laser range finder sensor 110 ensures a three-dimensional field of view of 360 degrees.

FIG. 5 illustrates a range capable of being sensed by the sensor 110 installed in a side-view mirror, according to an exemplary embodiment of the present disclosure. Referring to FIG. 5, since two sensors 110 may be respectively installed within both side-view mirrors 100, a field of view in the shape of a fan with respect to each side-view mirror 100 may be ensured. When the sensor 110 is installed within the side-view mirror 100, instead of the roof of the vehicle 1, blind spots may exist in the front and rear areas of the vehicle 1. Nevertheless, the sensor 110 may be configured to sense a wide area in all directions to ensure a relatively wide recognition range compared to when the sensor 110 is mounted on the roof.

The mirror 120 of the side-view mirror 100 provides a user with side and rear views of the vehicle 1. Although the side-view mirror 100 is a component essentially required for providing a user with side and rear views of the vehicle 1, the mirror 120 of the side-view mirror 100 may block or refract signals transmitted from or received by the sensor 110 installed within the side-view mirror 100. Accordingly, a mirror configured to transmit light of infrared wavelengths through the mirror 120 and reflect light of visible wavelengths through the mirror 120 may be mounted on the mirror 120 of the side-view mirror 100.

In other words, as shown in FIG. 6A, when the mirror 120 transmits light of infrared wavelengths, light of infrared wavelengths among light emitted from or received by the sensor 110 may be transmitted through the mirror 120, and accordingly, a distance to an object may be measured using the light of infrared wavelengths. Additionally, since the mirror 120 reflects light of visible wavelengths, the mirror 120 may provide the user with information regarding the environment on the side and rear areas of the vehicle 1. More specifically, the mirror 120 of the side-view mirror 100 may include a cold mirror. The cold mirror is a mirror that reflects light of visible wavelengths by passing the light through hot wires.

When the cold mirror is installed in the side-view mirror 100, the side-view mirror 100 may be configured to reflect light of visible wavelengths to the outside, and transmit light of infrared wavelengths, thereby enabling transmission/reception to/from objects, as shown in FIG. 6B. The cover 130 of the side-view mirror 100 may form the outer appearance of the side-view mirror 100, while protecting electronic components inside the side-view mirror 10. The outer structure of the side-view mirror 10 may be formed of a light transmitting material, such as transparent acrylic or polycarbonate, to increase optical transmittance. However, when the outer structure of the side-view mirror 10 is formed of a light transmitting material, the electronic components are exposed to the outside.

Accordingly, a band-pass filter configured to transmit infrared wavelengths and block visible wavelengths may be coated on the cover 130 of the side-view mirror 10. More specifically, the band-pass filter may have a characteristic of transmitting specific wavelengths. As shown in FIG. 7, when a band-pass filter configured to transmit infrared wavelengths is coated on the cover 130 of the side-view mirror 10, the electronic components are no longer susceptible to exposure. Additionally, since light of infrared wavelengths may be transmitted through the cover 130, light emitted from the sensor 110 may reach objects more stably. Further, the controller 200 may be configured to correct errors generated by the mirror 120 and the cover 130 based on a value measured by the sensor 110, then generate driving information suitable for autonomous driving, and operate the vehicle 1 based on the driving information. Hereinafter, errors generated by the mirror 120 and the cover 130 of the side-view mirror 10, and a method of correcting the errors will be described with reference to the appended drawings.

Figure 8:
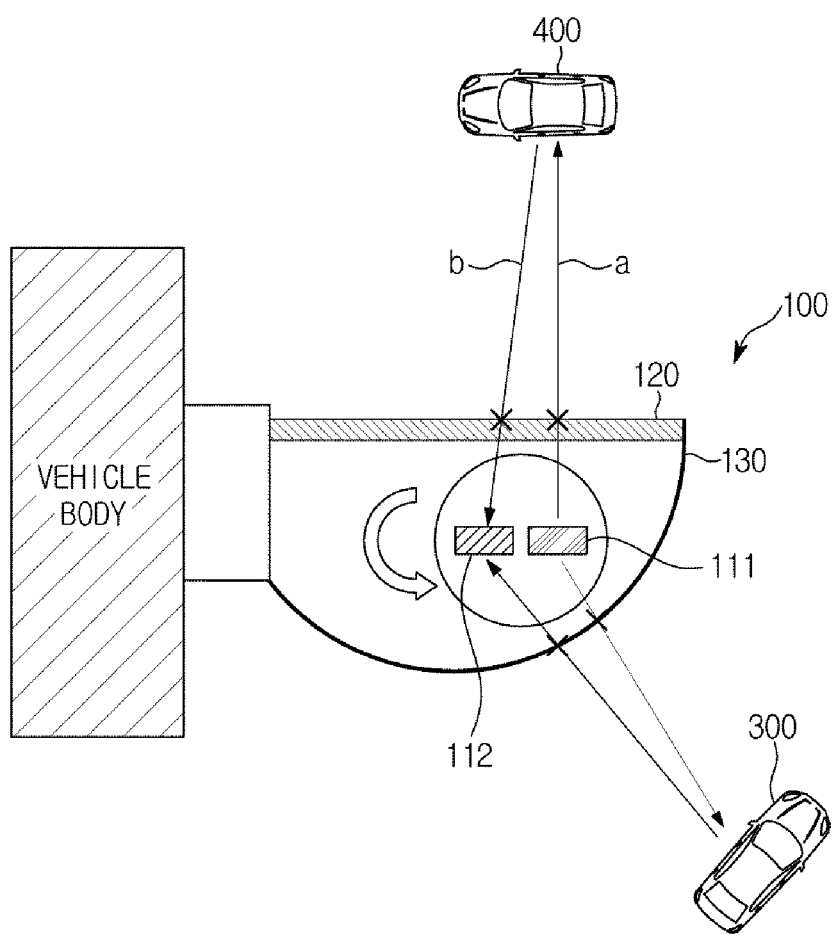
FIG. 8 illustrates a principle in which the sensor installed in the side-view mirror senses an external obstacle, according to an exemplary embodiment of the present disclosure.
Figure 9:
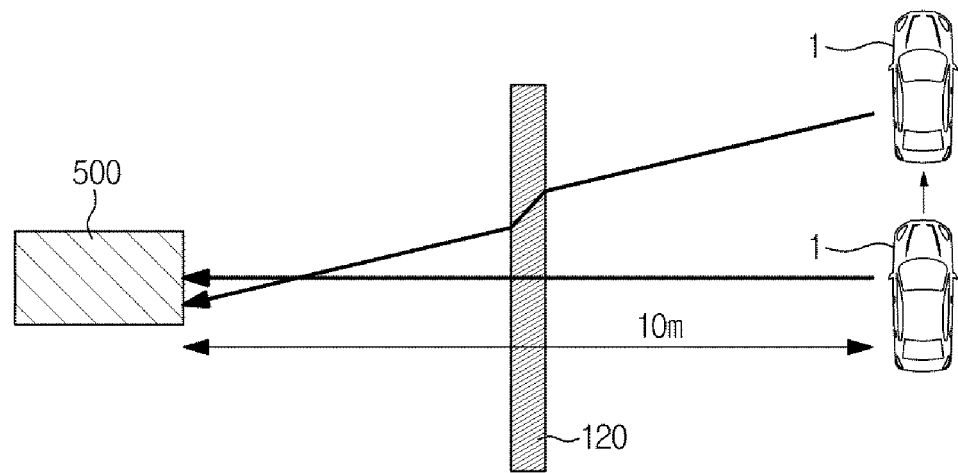
FIG. 9 illustrates the distortion of signals, caused by the mirror or the cover of the side-view mirror according to an exemplary embodiment of the present disclosure.

FIG. 8 is a view illustrating a principle in which the sensor 110 installed in the side-view mirror 100 senses an external obstacle, according to an exemplary embodiment of the present disclosure, FIG. 9 illustrates the distortion of signals, caused by the mirror 120 or the cover 130 of the side-view mirror 100, and FIG. 10 is a view illustrating a principle of correcting the distortion of signals, caused by the mirror 120 or the cover 130 of the side-view mirror 100.

Referring to FIG. 8, the sensor 110 installed in the side-view mirror 100 may include a transmitter 111 configured to emit signals (light), and a receiver 112 configured to receive signals reflected from an object. More specifically, the transmitter 110 may be configured to transmit a signal a toward an object 400, and the receiver 12 may be configured to receive a signal b reflected from the object 400. As described above with reference to FIG. 4, since the sensor 110 may rotate by 360 degrees with respect to the center axis, the sensor 110 may effectively be configured to sense a plurality of objects 3000 and 400 in a short period of time.

In FIG. 8, a case in which light emitted from the sensor 110 is transmitted and received in a linear manner without being refracted is shown due to the dimensional restriction of the drawing. However, signals may be refracted, when transmitted through the mirror 120 or the cover 130, to be distorted, as shown in FIG. 9 since light is refracted when transmitted through another medium.

Referring to FIG. 9, when light emitted from the sensor 110 is transmitted vertically through the mirror 120, no refraction may occur and thus, no correction is required. However, since the sensor 110 rotates by 360 degrees in a short period of time, and the vehicle 1 is also moving, light emitted from the sensor 110 may be incident diagonally to the mirror 120, as shown in FIG. 9, and thus, the light may be refracted. Accordingly, the refraction of light may need to be corrected for more accurate measurement.

Figures 10A, 10B:
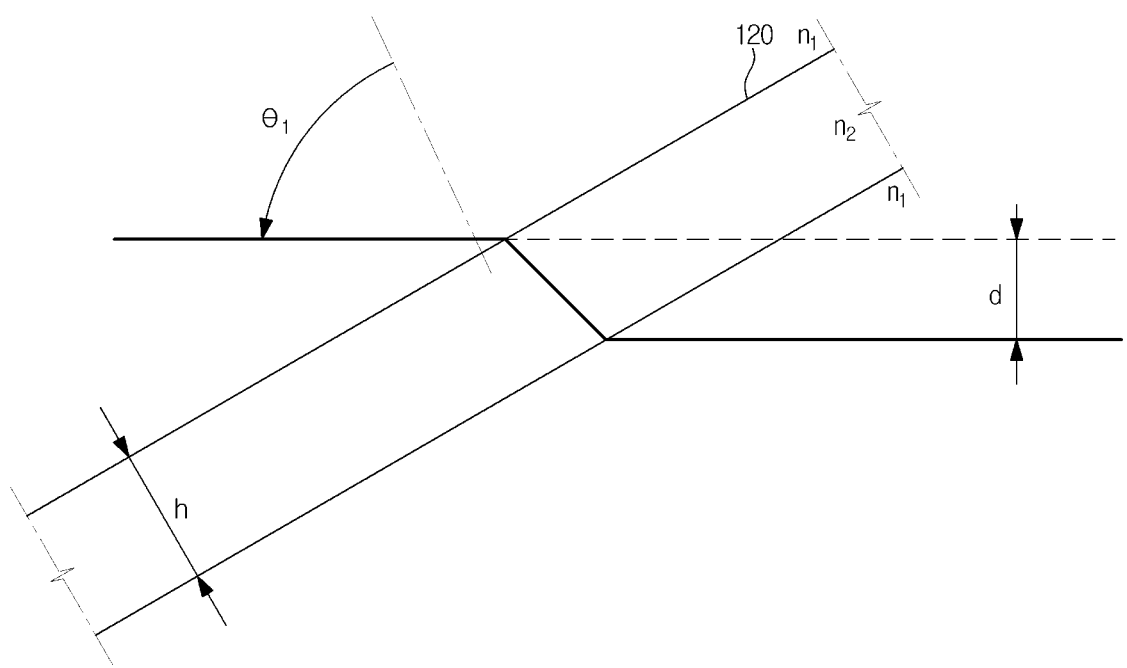
FIGS. 10A-10B illustrate a principle of correcting the distortion of signals, caused by the mirror or the cover of the side-view mirror.

FIG. 10A illustrates the refracted state of light emitted from the sensor when transmitted through the mirror, and FIG. 10B provides an equation for calculating an error D. Referring to FIG. 10, light emitted from the sensor 110 may be transmitted through the mirror 120, again move to the outside of the side-view mirror 100, and proceed with displacement of d in the same direction as the incident direction. Accordingly, the order of medium through which the light is transmitted may be the order of air (n1)→mirror (n2)→air (n1). The error d may be calculated by Equation (1), below.

$$d = h - \sin\theta_1 \left[ 1 - \frac{\cos\theta_1}{\sqrt{\left(\frac{n2}{n1}\right)^2 - \sin^2\theta_1}} \right], \quad (1)$$

where since variables n1 and n2 are known constants, and the incident angle of light may be calculated through the rotation location of a motor installed in the sensor 110.

The displacement d may be calculated according to Equation (1). Accordingly, the error caused by the distortion of signals may be corrected. Also, FIGS. 8, 9, and 10 relate to a method of correcting errors of signals emitted from the sensor 110, caused by the mirror 120, however, the above-described method may also be applied in the same way to the case in which light is transmitted through the cover 130.

Figure 11:
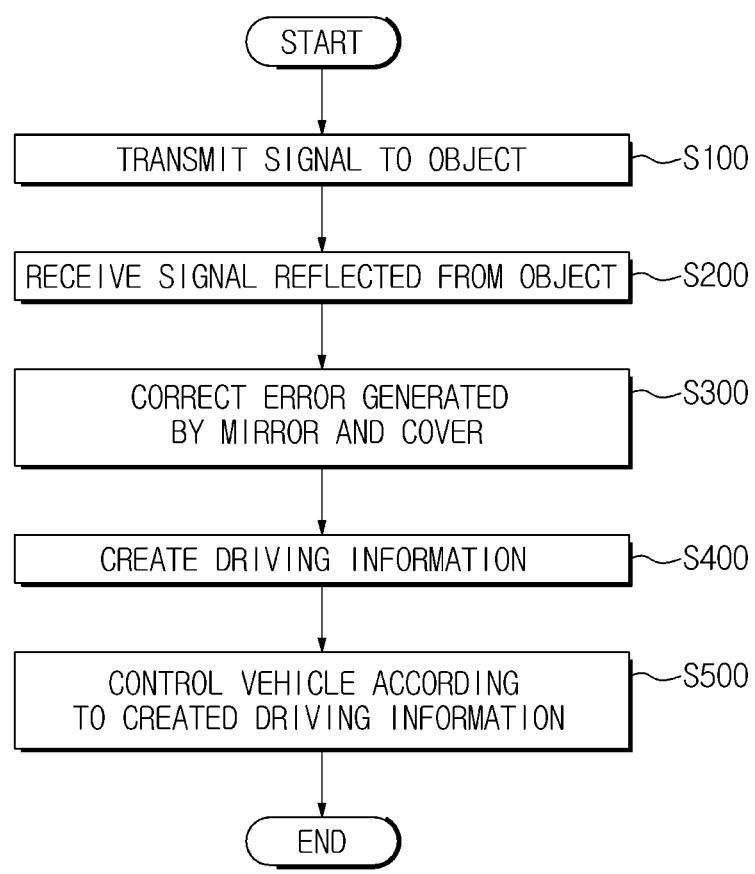
FIG. 11 is a flowchart illustrating a method of controlling a vehicle according to an exemplary embodiment of the present disclosure.

FIG. 11 is a flowchart illustrating a method of controlling a vehicle according to an exemplary embodiment of the present disclosure. The method described herein below may be executed by a controller having a processor and a memory. Referring to FIG. 11, the sensor 110 installed in the side-view mirror 100 may transmit a signal to an object, and receive the signal reflected from the object, in operations S100 and S200.

Although driving information may be generated directly based on the received signal, refraction may occur due to a change of medium when the signal is transmitted to or received from the outside, since the sensor 110 is installed in the inside of the side-view mirror 100. Accordingly, when the signal is received, an error of the signal caused by the mirror 120 and the cover 130 of the side-view mirror 100 may be corrected, in operation S300. The error may be corrected using Equation (1) expressed above. After the error of the signal is corrected, driving information may be generated based on the corrected signal, and the vehicle 1 may be operated by the controller based on the driving information, in operations S400 and S500.

Figure 12:
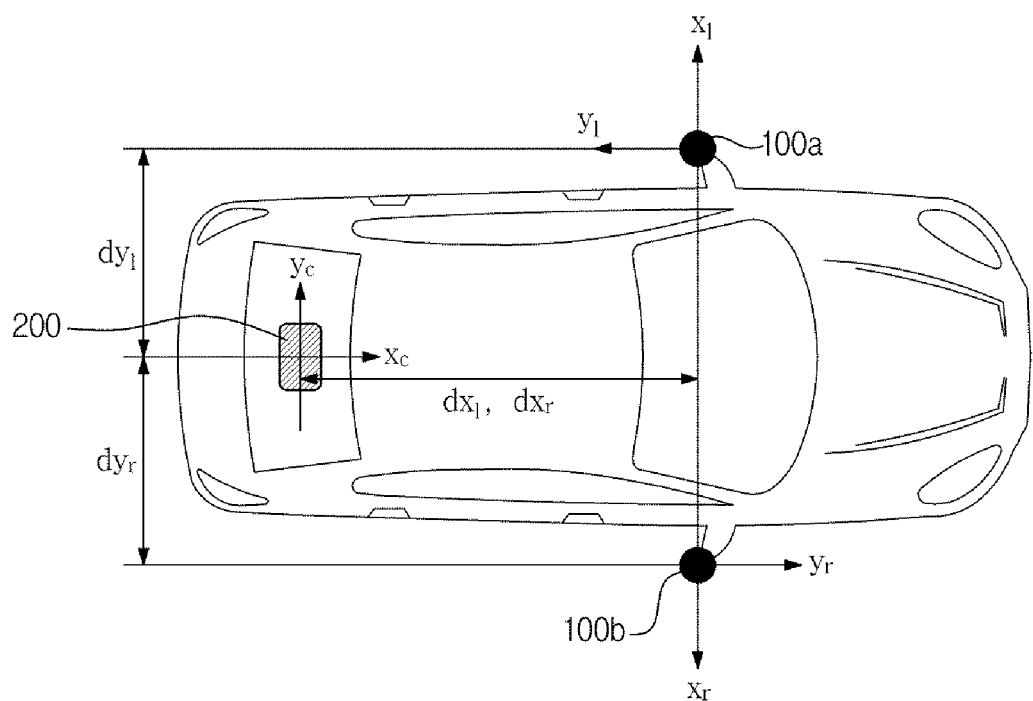
FIG. 12 illustrations the relation between raw data acquired by the sensor and created driving information, according to another exemplary embodiment of the present disclosure.
Figure 14:
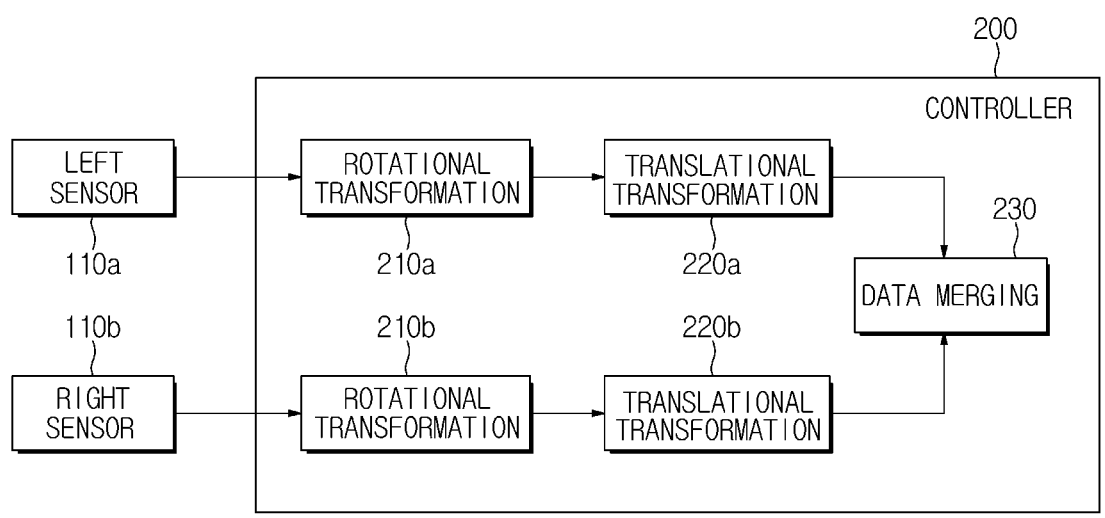
FIG. 14 illustrates a process of merging data based on raw data acquired by the sensor according to an exemplary embodiment of the present disclosure.

FIG. 12 is a view illustrating the relation between raw data acquired by the sensor and generated driving information, according to another exemplary embodiment of the present disclosure, and FIG. 13 provides the equation for performing rotational transformation based on raw data acquired by the sensor. FIG. 14 is a view illustrating a process of merging data based on raw data acquired by the sensor.

Methods of generating driving information of the vehicle 1 according to an exemplary embodiment of the present disclosure may be classified into two methods. The first method may be a method of generating driving information based on information acquired by each sensor 110, merging the driving information in the controller 200, and providing the merged driving information to a user. In other words, the controller 200 may be configured to merge driving information acquired with respect to the left side-view mirror 100a of the vehicle 1 with driving information acquired with respect to the right side-view mirror 100b of the vehicle 1 to generate final driving information to be provided to the user. In particular, the sensor 110 may further include a separate controller (not shown) configured to generate driving information, and the controller 200 may be configured to merge the driving information generated by the controller of the sensor 110 to provide the merged driving information to the user.

The second method may be a method of transmitting raw data acquired by the sensor 110 to the controller 200, and generating driving information in the controller 200 based on the received raw data. In other words, the controller 200 may be configured to merge raw data acquired with respect to the left side-view mirror 100a of the vehicle 1 with raw data acquired with respect to the right side-view mirror 100b of the vehicle 1, and generate driving information based on the merged data. More specifically, referring to FIG. 12, the left side-view mirror 100a of the vehicle 1 may be configured to acquire raw data $x_l$ and $y_l$ with respect to the left side-view mirror 100a, and the right side-view mirror 100b of the vehicle 1 may be configured to acquire raw data $x_r$ and $y_r$ with respect to the right side-view mirror 100b. Although not shown in FIG. 11, raw data for a z-axis direction which is the upward direction from the vehicle 1 may be received.

The received raw data may need to be transformed with respect to the center coordinates of the vehicle 1 since the reference axes of the raw data are different from each other. Accordingly, as shown in FIG. 13, coordinate transformation may be performed by rotational transformation. The equation shown in FIG. 13 may be equation by coordinate transformation, wherein an offset in the upward direction from the vehicle 1 is assumed as dz. Additionally, FIG. 13 relates to a process of transforming raw data received with respect to the left side-view mirror 100a, however, a process of transforming raw data received with respect to the right side-view mirror 100b may be also performed in the same manner.

The rotational-transformed data may be subject to translational transformation, and then merged to generate final driving information to be provided to the user. In other words, as shown in FIG. 14, raw data may be received from the left sensor 110a, and rotational transformation (210a) and translational transformation (220a) may be performed on the raw data to generate data, and simultaneously, raw data may be received from the right sensor 110b, and rotational transformation (210b) and translational transformation (220b) may be performed on the raw data to generate data. The generated data may be merged to generate driving information based on the center coordinates of the vehicle 1, and the generated driving information may be provided to a user. Accordingly, it is unnecessary to install a signal processing controller in the sensor 110, thereby simplifying the system and providing driving information to a user more rapidly, and also, it is unnecessary to install a controller in the sensor 110, resulting in a reduction of manufacturing costs. The raw data may contain information about vehicles acquired from sensor.

Figure 15:
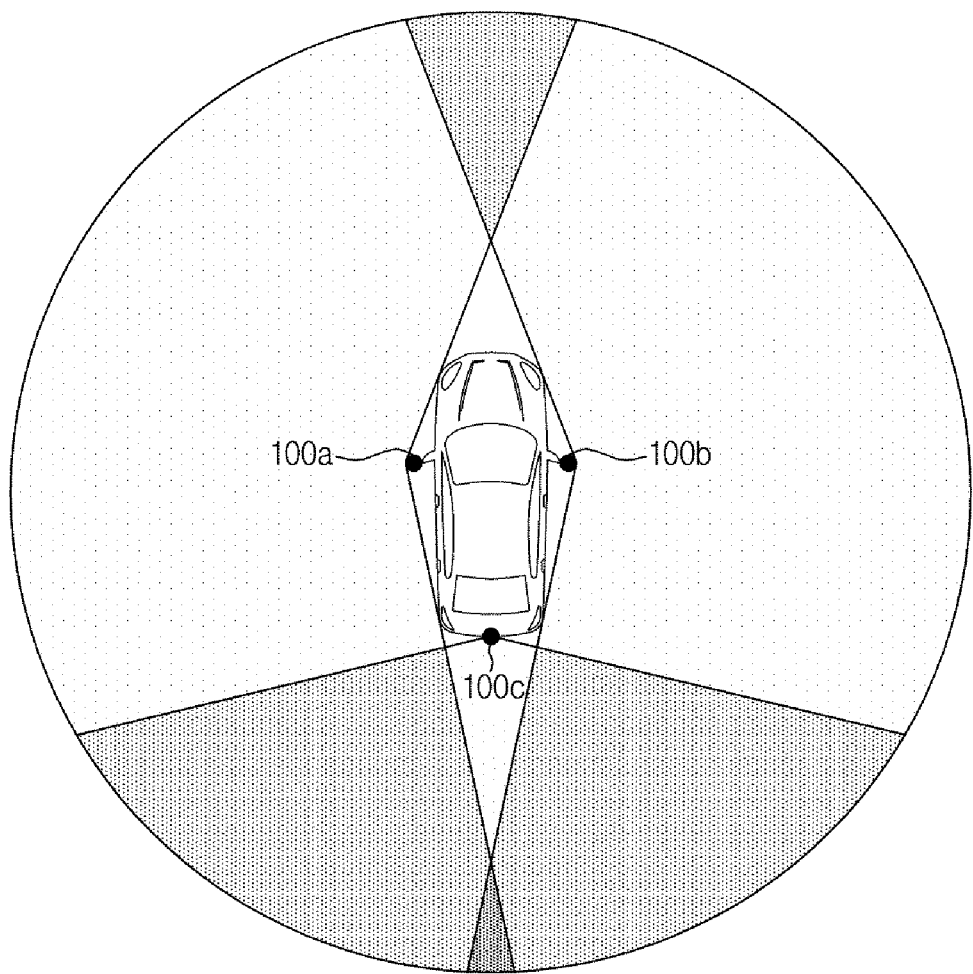
FIG. 15 illustrates a range that can be sensed by the sensor, according to another exemplary embodiment of the present disclosure.

FIG. 15 illustrates a range capable of being sensed by the sensor, according to another exemplary embodiment of the present disclosure. As described above with reference to FIG. 5, since the three dimension laser range finder sensor 110 is installed in the vehicle 1, blind spots may exist in the front and rear areas of the vehicle 1. Accordingly, as shown in FIG. 15, when a sensor is additionally installed in the rear portion of the vehicle 1 to sense the blind spots, a disadvantage due to blind spots may be prevented. The sensor installed in the rear portion of the vehicle 1 may be also installed within the vehicle 1, and an error caused by the external structure of the vehicle 1 may also be corrected by the above-described principle. FIG. 15 relates to when a sensor is installed in the rear portion of the vehicle 1, however, another sensor may be additionally installed in the front portion of the vehicle 1 to compensate the disadvantage due to blind spots.

The features and effects of the present disclosure have been described in detail with reference to the accompanying drawings. An autonomous driving vehicle according to the typical technique has a disadvantage that a three dimension laser range finder sensor configured to sense the surrounding environment of the vehicle is directly exposed to the outside environment since the sensor is mounted on the roof of the vehicle, and a fixture mounted on the roof of the vehicle deteriorates the exterior design of the vehicle. However, in the vehicle 1 according to the present disclosure, since the three dimension laser range finder sensor is installed in the inside of the side-view mirror of the vehicle 1, not on the roof of the vehicle 1, the external appearance of the vehicle 1 is maintained, while preventing a deterioration of fuel efficiency due to an increase of weight and an increase of air resistance according to the addition of a sensor fixture. Additionally, by correcting errors of signal measurement that caused due to the installation of the sensor in the inside of the side-view mirror, autonomous driving rmay be performed according to more accurate information.

Although the present disclosure has been described based on the limited exemplary embodiments and drawings, various corrections and modifications from the above description can be made by one of ordinary skill in the art. For example, although the above-described techniques are performed in a different order from that of the above-described method, and/or the above-described components, such as system, structure, apparatus, and circuit, are coupled or combined in a different form from that of the above-described method, or replaced or substituted with other components or equivalents, proper results can be achieved. Therefore, the scope of claims which will be described below may cover other implementations, embodiments, and equivalents of the claims.

What is claimed is:

1. A vehicle, comprising:
a side-view mirror,
at least one sensor disposed in the side-view mirror, and configured to transmit a signal to an object and receive a signal reflected from the object; and
a controller configured to generate driving information based on the signal received by the sensor,
wherein the controller is configured to correct distortion of the transmitted signal and the received signal of the sensor to generate the driving information, and
wherein the distortion corrected by the controller is generated by at least one of a cover of the side-view mirror and a mirror of the side-view mirror.

2. The vehicle according to claim 1, wherein the controller is configured to correct refraction of the signal generated when the signal is transmitted through the cover or the mirror of the side-view mirror.

3. The vehicle according to claim 2, wherein the controller is configured to correct the distortion of the signal based on a thickness of the mirror of the side-view mirror and an incident angle of the signal transmitted from the sensor.

4. The vehicle according to claim 2, wherein the controller is configured to correct the distortion of the signal based on a thickness of the cover of the side-view mirror and an incident angle of the signal transmitted from the sensor.

5. The vehicle according to claim 1, wherein the cover and the mirror further include a material disposed thereon to enable the signal to be transmitted through the cover and the mirror.

6. The vehicle according to claim 5, wherein the mirror transmits light of infrared wavelengths and reflects light of visible wavelengths.

7. The vehicle according to claim 5, wherein a filter configured to transmit light of infrared wavelengths is coated on the outer surface of the cover.

8. The vehicle according to claim 1, further comprising another sensor disposed in a front portion and a rear portion of the vehicle.

9. The vehicle according to claim 8, wherein the controller is configured to generate the driving information based on information received by the sensor disposed in the side-view mirror and the other sensor disposed in the front portion and the rear portion of the vehicle.

10. A method of controlling a vehicle including at least one sensor disposed in a side-view mirror, comprising:
transmitting, by a controller, a signal to an object and receiving a signal reflected from the object; and
generating by the controller, driving information based on the signal received by the sensor,
wherein the generating of the driving information includes correcting distortion of the transmitted signal and the received signal to generate the driving information, and
wherein the distortion corrected by the controller is generated by at least one of a cover of the side-view mirror and a mirror of the side-view mirror.

11. The method according to claim 10, wherein the correcting of the distortion of the signal includes correcting by the controller, refraction of the signal generated when the signal is transmitted through the cover or the mirror of the side-view mirror.

12. The method according to claim 10, wherein the mirror transmits light of infrared wavelengths and reflects light of visible wavelengths.

13. The method according to claim 10, wherein a filter configured to transmit light of infrared wavelengths is coated on the outer surface of the cover.

14. The method according to claim 13, wherein the generating of the driving information includes receiving, by the controller, raw data from the sensor disposed in the side-view mirror and merging the raw data to generate the driving information.

15. The method according to claim 14, wherein the generating of the driving information includes performing, by the controller, coordinate transformation on the raw data with respect to the reference point of the vehicle and merging the resultant data to generate the driving information.

16. The method according to claim 15, wherein the coordinate transformation includes performing by the controller, rotational transformation on the raw data.

17. The method according to claim 16, wherein the coordinate transformation includes performing by the controller, translational transformation on the raw data.

18. The method according to claim 13, wherein the generating of the driving information includes generating, by the controller, driving information with respect to the sensor and merging the created driving information with respect to the reference point of the vehicle.

* * * * *